United States Patent
Shiokawa et al.

(10) Patent No.: US 11,192,288 B2
(45) Date of Patent: Dec. 7, 2021

(54) CONTAINER MANUFACTURING METHOD

(71) Applicant: YOSHINO KOGYOSHO CO., LTD., Tokyo (JP)

(72) Inventors: Mitsuru Shiokawa, Tokyo (JP); Hideaki Hoshino, Tokyo (JP); Shinichi Tabata, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 157 days.

(21) Appl. No.: 16/492,219

(22) PCT Filed: Jan. 25, 2018

(86) PCT No.: PCT/JP2018/002237
§ 371 (c)(1),
(2) Date: Sep. 9, 2019

(87) PCT Pub. No.: WO2018/179747
PCT Pub. Date: Oct. 4, 2018

(65) Prior Publication Data
US 2020/0001515 A1    Jan. 2, 2020

(30) Foreign Application Priority Data

Mar. 27, 2017 (JP) .............................. JP2017-061646

(51) Int. Cl.
*B29C 49/46* (2006.01)
*B29C 49/24* (2006.01)
(Continued)

(52) U.S. Cl.
CPC .............. *B29C 49/46* (2013.01); *B29C 49/24* (2013.01); *B29C 2049/465* (2013.01);
(Continued)

(58) Field of Classification Search
None
See application file for complete search history.

(56) References Cited

U.S. PATENT DOCUMENTS

| 2017/0021553 A1 | 1/2017 | Kharchenko et al. |
| 2017/0100873 A1 | 4/2017 | Tabata et al. |

FOREIGN PATENT DOCUMENTS

| CN | 104968568 A | 10/2015 |
| EP | 2902169 A1 | 8/2015 |

(Continued)

OTHER PUBLICATIONS

Dec. 9, 2020 Search Report issued in European Patent Application No. 18777361.9.

(Continued)

*Primary Examiner* — Monica A Huson
(74) *Attorney, Agent, or Firm* — Oliff PLC

(57) ABSTRACT

A container manufacturing method includes: a liquid discharge step in which a predetermined amount of liquid (L) in the container (C) is discharged to the outside by supplying pressurized air from air holes (13) provided in a blow molding mold (11) to a cavity (12) and pushing an outer surface of the container (C) after molding by the air; and a headspace forming step in which a headspace (HS) is formed in the container (C) by separating a filling nozzle (22) from a mouth portion (Ca) of the container (C) in a state in which a predetermined amount of liquid (L) is discharged to the outside.

2 Claims, 5 Drawing Sheets

(51) Int. Cl.
  *B29K 623/00*     (2006.01)
  *B29K 667/00*     (2006.01)
  *B29L 31/00*      (2006.01)

(52) U.S. Cl.
  CPC .... *B29K 2623/12* (2013.01); *B29K 2667/003* (2013.01); *B29L 2031/7158* (2013.01)

(56)            References Cited

FOREIGN PATENT DOCUMENTS

| JP | H05-31793 A    | 2/1993  |
| JP | H05-338018 A   | 12/1993 |
| JP | 2016-504219 A  | 2/2016  |
| WO | 2015/079627 A1 | 6/2015  |
| WO | 2015/136369 A2 | 9/2015  |
| WO | 2017/033390 A1 | 3/2017  |
| WO | 2017/208574 A1 | 12/2017 |

OTHER PUBLICATIONS

Nov. 27, 2020 Office Action issued in Chinese Patent Application No. 201880016319.X.
Feb. 27, 2018 International Search Report issued in International Patent Application No. PCT/JP2018/002237.

CONTAINER MANUFACTURING METHOD

TECHNICAL FIELD

The present disclosure relates to a container manufacturing method in which a container that contains a content liquid is manufactured by liquid blow molding a synthetic resin preform.

BACKGROUND

Synthetic resin containers, representatives of which are polypropylene (PP) bottles and polyethylene terephthalate (PET) bottles, are used in applications in which a variety of liquids such as beverages and toiletries including cosmetics, chemicals, detergents, shampoos or the like are contained as a content liquid. Such containers are generally manufactured by blow molding a preform formed into a substantially test tube shape by a thermoplastic synthetic resin material described above.

As the blow molding in which a preform is molded into a container, liquid blow molding is known, in which, as a pressurized medium supplied into a preform, a pressurized liquid is used instead of pressurized air.

As described in Patent Literature 1 (PTL 1), for example, a container manufacturing method is known, in which a container that contains a content liquid is manufactured by using a liquid (content liquid) such as beverage and the like that is finally contained in a container as a pressurized medium used for liquid blow molding. With this container manufacturing method, a step of filling a content liquid into a container after molding can be omitted. Thus the manufacturing step or the configuration of the manufacturing line (apparatus) can be simplified.

CITATION LIST

Patent Literature

PTL 1: JP2016504219A

SUMMARY

Technical Problem

As with the above described conventional container manufacturing method, when a liquid to be finally contained in a container is used as a pressurized medium used for liquid blow molding, preferably, a headspace (a space not filled with a content liquid) of a proper size is formed in a container after molding.

In the above described conventional container manufacturing method, after a pressurized liquid supplied to a liquid supply path is supplied from a filling nozzle into a preform to liquid blow mold the preform, a compression tab installed in a blow molding mold is projected toward the inside of a cavity to push an outer surface of the container after molding by the compression tab. In this manner, a predetermined amount of content liquid is discharged from the container and a predetermined amount of headspace is formed in the container.

However, with this method, it is necessary to use a blow molding mold of a complicated configuration that includes a compression tab and its drive mechanism, which causes an increase in manufacturing cost of the container.

The present disclosure has been conceived in view of the above problem, and is to provide a container manufacturing method in which a headspace of a desired size can be formed without complicating a configuration of a blow molding mold.

Solution to Problem

A container manufacturing method according to an embodiment of the present disclosure is a container manufacturing method in which a container that contains a content liquid is manufactured by liquid blow molding a synthetic resin preform, the method including:

a preform setup step in which the preform is disposed in a blow molding mold and a filling nozzle connected to a liquid supply path is engaged with a mouth portion of the preform;

a blow molding step in which the preform is liquid blow molded into a shape conforming to a cavity of the blow molding mold by supplying a pressurized liquid supplied to the liquid supply path from the filling nozzle into the preform;

a liquid discharge step in which a predetermined amount of liquid in the container is discharged to the outside thereof by supplying pressurized air from air holes provided in the blow molding mold to the cavity and pushing an outer surface of the container after molding by the air; and a headspace forming step in which a headspace is formed in the container by separating the filling nozzle from a mouth portion of the container in a state in which a predetermined amount of liquid is discharged to the outside.

In an embodiment according to the present disclosure, in the blow molding step, the preform may be liquid blow molded in a state in which a label is adsorbed on the air holes in the cavity by sucking the air from the air holes.

Advantageous Effect

According to the present disclosure, a container manufacturing method can be provided, in which a headspace of a desired size can be formed in a container without complicating a configuration of a blow molding mold.

DETAILED DESCRIPTION

Figure 1:
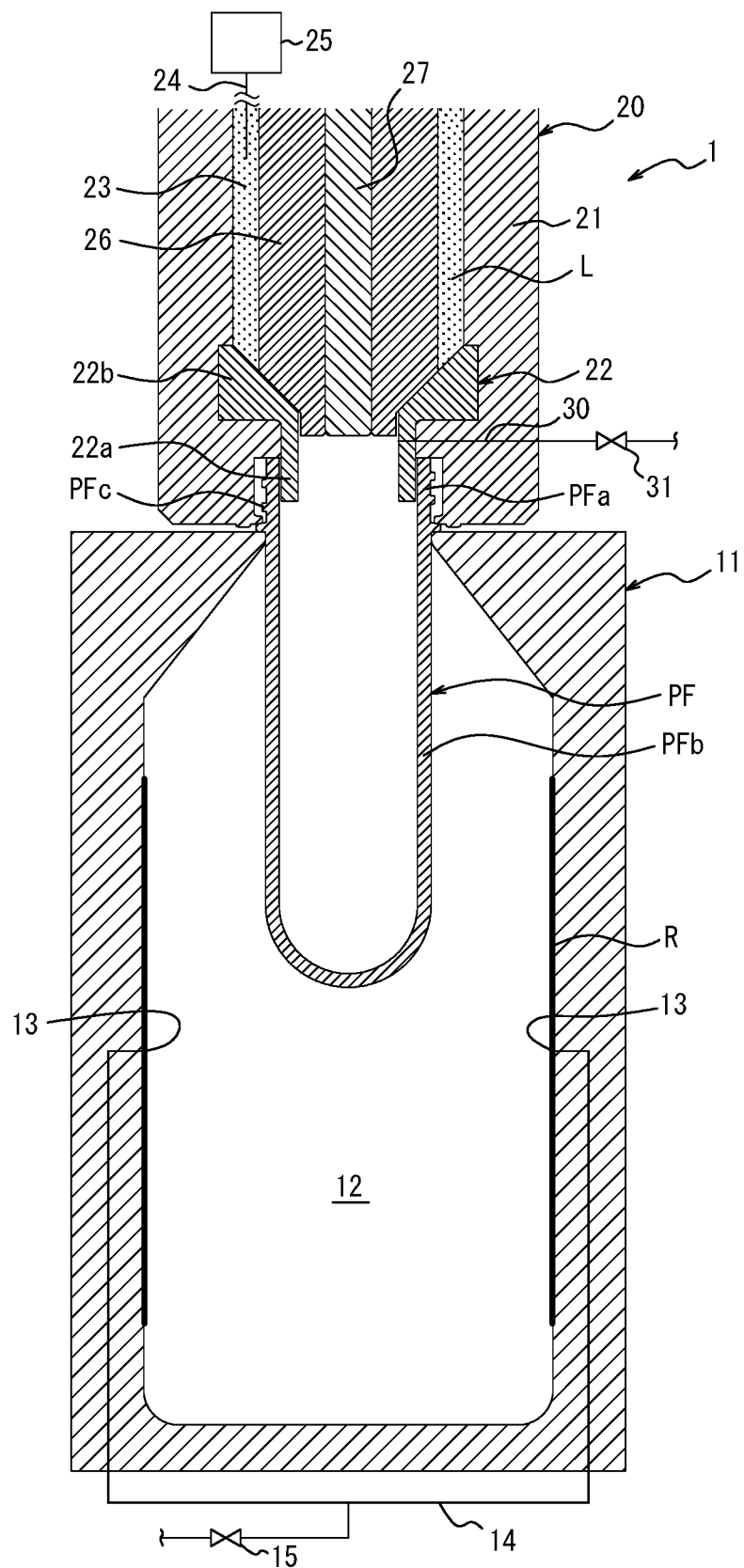
FIG. 1 is a longitudinal cross-sectional view illustrating a state in which a preform is set in a liquid blow molding apparatus, in a preform setup step of a container manufacturing method according to an embodiment of the present disclosure.

The container manufacturing method according to an embodiment of the present disclosure will be described in more detail below with reference to drawings.

The container manufacturing method according to an embodiment of the present disclosure is a container manufacturing method in which a container that contains a content liquid is manufactured by liquid blow molding a synthetic resin preform. The method includes: a preform setup step in which a preform is disposed in a blow molding mold and a filling nozzle connected to a liquid supply path is engaged with a mouth portion of the preform; a blow molding step in which the preform is liquid blow molded into a shape conforming to a cavity of the blow molding mold by supplying a pressurized liquid supplied to the liquid supply path from the filling nozzle into the preform; a liquid discharge step in which a predetermined amount of liquid in the container is discharged to the outside thereof by supplying pressurized air from air holes provided in the blow molding mold to the cavity and pushing an outer surface of the container after molding by the air; and a headspace forming step in which a headspace is formed in the container by separating the filling nozzle from a mouth portion of the container in a state in which a predetermined amount of liquid is discharged to the outside.

The container manufacturing method according to an embodiment of the present disclosure can be performed by using a liquid blow molding apparatus 1 configured as illustrated in FIGS. 1 to 5, for example.

The liquid blow molding apparatus 1 manufactures a container C that contains a liquid (content liquid) L and includes a headspace HS of a predetermined size by liquid blow molding a synthetic resin preform PF. In the liquid blow molding, a pressurized liquid L is supplied to the preform PF to mold the preform PF into a container C of a shape conforming to a cavity 12 of a blow molding mold 11.

As the liquid L supplied to the preform PF in the liquid blow molding, a liquid that is contained, as a content liquid L, in the container C after molding is used. Examples of such a liquid L include, for example, beverages and toiletries such as cosmetics, chemicals, detergents, shampoos and the like.

The preform PF is formed by injection molding, direct blow molding, extrusion molding and the like by using thermoplastic synthetic resins such as polypropylene (PP) and polyethylene terephthalate (PET) or the like as a material. In this embodiment, the preform PF is formed into a substantially test tube shape including a cylindrical mouth portion PFa, which is an open end, and a bottomed cylindrical barrel PFb that is connected to the mouth portion PFa and has a closed bottom end.

The shape of the preform PF is not limited to those described above, and preforms having a variety of shapes and made of a variety of materials may be used depending on the shape or the material of the container C after molding.

On the outer wall surface of the mouth portion PFa is integrally provided with a male thread PFc configured to mount, to the mouth portion Ca of the container C after molding, a closing cap that closes the mouth portion Ca, a spout cap provided with a spout nozzle, or a cap that mounts a discharge apparatus having a pump (not illustrated). Instead of the male thread PFc, an engaging protrusion configured to mount a variety of caps described above by plugging (undercut engagement) may also be provided on the outer wall surface of the mouth portion PFa.

After being heated in advance to a predetermined temperature at which stretchability is achieved by using a heating means such as a heater or the like, the preform PF is disposed, in the blow molding mold 11, in a standing posture in which the barrel PFb is disposed in the cavity 12 and the mouth portion PFa protrudes upward from the cavity 12, as illustrated in FIG. 1.

In this embodiment, the cavity 12 of the blow molding mold 11 is formed into a shape corresponding to a final shape of the container such as a bottle shape, for example. That is, in this embodiment, the container C after molding is formed into a bottle shape that includes a cylindrical mouth portion Ca, a barrel Cb being continuous with the mouth portion Ca and having a diameter larger than that of the mouth portion Ca, and a bottom Cc that closes the lower end of the barrel Cb. The cavity 12 opens upward at a top surface of the blow molding mold 11 and allows the mouth portion PFa of the preform PF to protrude upward from the opening as described above.

Although not illustrated in detail, the blow molding mold 11 can be opened right and left. After the preform PF is molded into the container C containing a liquid, the blow molding mold 11 can be opened right and left, and the container C containing a liquid can be ejected from the blow molding mold 11.

The blow molding mold 11 includes a plurality of air holes 13 communicating with the cavity 12 and an air supply path 14 connected to the air holes 13. The air supply path 14 is connected to a pressure source (not illustrated) via an opening-closing valve 15. In this embodiment, the air holes 13 are disposed, in the blow molding mold 11, in the position corresponding to the barrel Cb of the container C after molding.

A label (in-mold label) R is provided on the air holes 13. The label R is attached to the outer surface of the barrel Cb of the container C in the blow molding mold (in-mold) during liquid blow molding. For example, in the preform setup step, the label R may be disposed in the blow molding mold 11 before the preform PF is disposed in the blow molding mold 11. The label R is adsorbed on the air holes 13, until it is attached to the barrel Cb of the container C, by sucking the air from the air holes 13 when the opening-closing valve 15 is opened and a negative pressure is applied from the pressure source, and is held stably in the blow molding mold 11. The label R may have a tubular shape disposed over the entire periphery of the barrel Cb of the container C or may be disposed over only a part of the entire periphery. As described above, the shape of the label R is not limited.

The air holes 13 can allow the air to flow out toward the outer surface of the barrel Cb of the container C when the opening-closing valve 15 is opened after the container C is molded and pressurized air is supplied from the pressure source. In this manner, the outer surface of the barrel Cb is pushed by the air (via the label R) (see FIG. 4).

In this embodiment, although the label R is attached to the container C by in-mold labeling, the label R may be attached to the container C after opening the mold, or the label R may not be provided to the container C. The number of air holes 13 provided to the blow molding mold 11 can be appropriately determined, and a single air hole may be provided. In the blow molding mold 11, one or more air holes 13 may be disposed in a position corresponding to the bottom Cc of the container C after molding, instead of or in addition to a position corresponding to the barrel Cb of the container C after molding.

A nozzle unit 20 is provided above the blow molding mold 11 such that it is vertically movable relative to the blow molding mold 11. The nozzle unit 20 includes a main body block 21 and a filling nozzle 22.

The filling nozzle 22 is configured by integrally forming a nozzle body 22a formed into a cylindrical shape and inserted into the mouth portion PFa of the preform PF and a clamping portion 22b having a large diameter and integrally formed with the nozzle body 22a by using steel, resin material, or the like, for example. The filling nozzle 22 is fixed to the main body block 21 by fitting the clamping portion 22b into the main body block 21. The nozzle body 22a is disposed coaxially with the cavity 12 of the blow molding mold 11, and is configured to engage with the mouth portion PFa of the preform PF mounted to the blow molding mold when the nozzle unit 20 is brought down to a predetermined position.

A liquid supply path 23 configured to extend vertically and coaxially with the nozzle body 22a is provided in the main body block 21. The liquid supply path 23 is provided to supply a liquid L to the filling nozzle 22, and communicates with the filling nozzle 22 at the lower end thereof.

A pressurized liquid supply portion 25 is connected to the liquid supply path 23 via a pipe 24. The pressurized liquid supply portion 25 can supply a liquid L pressurized to a predetermined pressure to the liquid supply path 23 via the pipe 24. As the pressurized liquid supply portion 25, those using a plunger pump as a pressurizing source can be used.

When a pressurized liquid L is supplied from the pressurized liquid supply portion 25 to the liquid supply path 23, the liquid L is supplied from the liquid supply path 23 into the preform PF disposed in the blow molding mold 11 via the filling nozzle 22. In this manner, the preform PF is liquid blow molded, by the pressurized liquid L, into a container C of a shape conforming to the cavity 12 of the blow molding mold 11.

A seal body 26 configured to open and close the filling nozzle 22 with respect to the liquid supply path 23 is disposed in the liquid supply path 23. The seal body 26 is formed into a cylindrical shape extending along the axial center of the liquid supply path 23, and is vertically movable in the liquid supply path 23. When the seal body 26 moves to the lower stroke end and its lower end surface comes in contact with the upper surface of the clamping portion 22b, communication between the liquid supply path 23 and the nozzle body 22a is blocked by the seal body 26, and the filling nozzle 22 is closed with respect to the liquid supply path 23. On the other hand, when the seal body 26 moves upward from its closing state and its lower end surface separates from the upper surface of the clamping portion 22b, the liquid supply path 23 and the nozzle body 22a communicate with each other and the filling nozzle 22 is opened with respect to the liquid supply path 23.

The nozzle unit 20 is provided with a discharge path 30 that branches from the filling nozzle 22 with respect to the liquid supply path 23. That is, the discharge path 30 is connected to the filling nozzle 22 on the downstream side of the position blocked by the filling nozzle 22 and the seal body 26. The discharge path 30 is provided with the opening-closing valve 31, and the discharge path 30 can be opened or closed by opening or closing the opening-closing valve 31. The discharge path 30 is connected to a tank, which is not illustrated.

Therefore, when the nozzle body 22a is engaged with the mouth portion PFa of the preform PF and the pressurized liquid supply portion 25 is operated in a state in which the seal body 26 is opened such that the liquid supply path 23 communicates with the filling nozzle 22 and the opening-closing valve 31 of the discharge path 30 is closed, a pressurized liquid L is supplied from the pressurized liquid supply portion 25 into the preform PF via the liquid supply path 23 and the filling nozzle 22 and thus the preform PF can be liquid blow molded. When the preform PF is liquid blow molded, the seal body 26 may be opened at the same time as the pressurized liquid supply portion 25 is operated, or the seal body 26 may be opened after the pressurized liquid supply portion 25 is operated. Further, after the liquid blow molding, when the pressurized air is supplied from the air holes 13 to the cavity 12 in a state in which the filling nozzle 22 is closed with respect to the liquid supply path 23 by closing the seal body 26 and the opening-closing valve 31 of the discharge path 30 is opened, the outer surface of the container C is pushed by the air and a predetermined amount of liquid L in the container C can be discharged out of the container C toward the discharge path 30.

The nozzle unit 20 may not be provided with the discharge path 30. In this case, after the liquid blow molding, pressurized air is supplied from the air holes 13 to the cavity 12 with the filling nozzle 22 opened relative to the liquid supply path 23. In this manner, the outer surface of the container C is pushed by the air, and a predetermined amount of liquid L in the container C can be discharged out of the container C toward the liquid supply path 23.

As illustrated, the liquid blow molding apparatus 1 may include a stretching rod 27. The stretching rod 27 is inserted into the axial center of the seal body 26 such that it is vertically movable relative to the seal body 26 and is retractable from the lower end of the seal body 26 toward the inside of the cavity 12. When the stretching rod 27 is moved downward, the preform PF can be axially stretched by the stretching rod 27. In this manner, when the stretching rod 27 is provided, the liquid blow molding apparatus 1 can perform biaxial stretch blow molding in which the preform PF is axially stretched by the stretching rod 27 while being radially stretched by the pressurized liquid L.

The liquid blow molding apparatus 1 may not include the stretching rod 27.

Subsequently a method for manufacturing a container C (a container manufacturing method according to an embodiment of the present disclosure) will be described. In the method, a container C having a predetermined shape and containing a content liquid L is manufactured by liquid blow molding a synthetic resin preform PF by using the liquid blow molding apparatus 1 configured in the above described manner.

First, a preform setup step is performed. In the preform setup step, first, as illustrated in FIG. 1, a label R is disposed in the cavity 12, and the label R is adsorbed on the air hole 13 by sucking the air from the air holes 13. Subsequently a preform PF heated in advance to a predetermined temperature (e.g. from 80° C. to 150° C.) around which stretchability is achieved by using a heating means (not illustrated), such as a heater, is disposed in the blow molding mold 11 and is clamped. Further, the nozzle unit 20 is brought down and the nozzle body 22a of the filling nozzle 22 is engaged with the mouth portion PFa of the preform PF. In the preform setup step, the filling nozzle 22 is closed by the seal body 26 and the pressurized liquid supply portion 25 is stopped.

Figure 2:
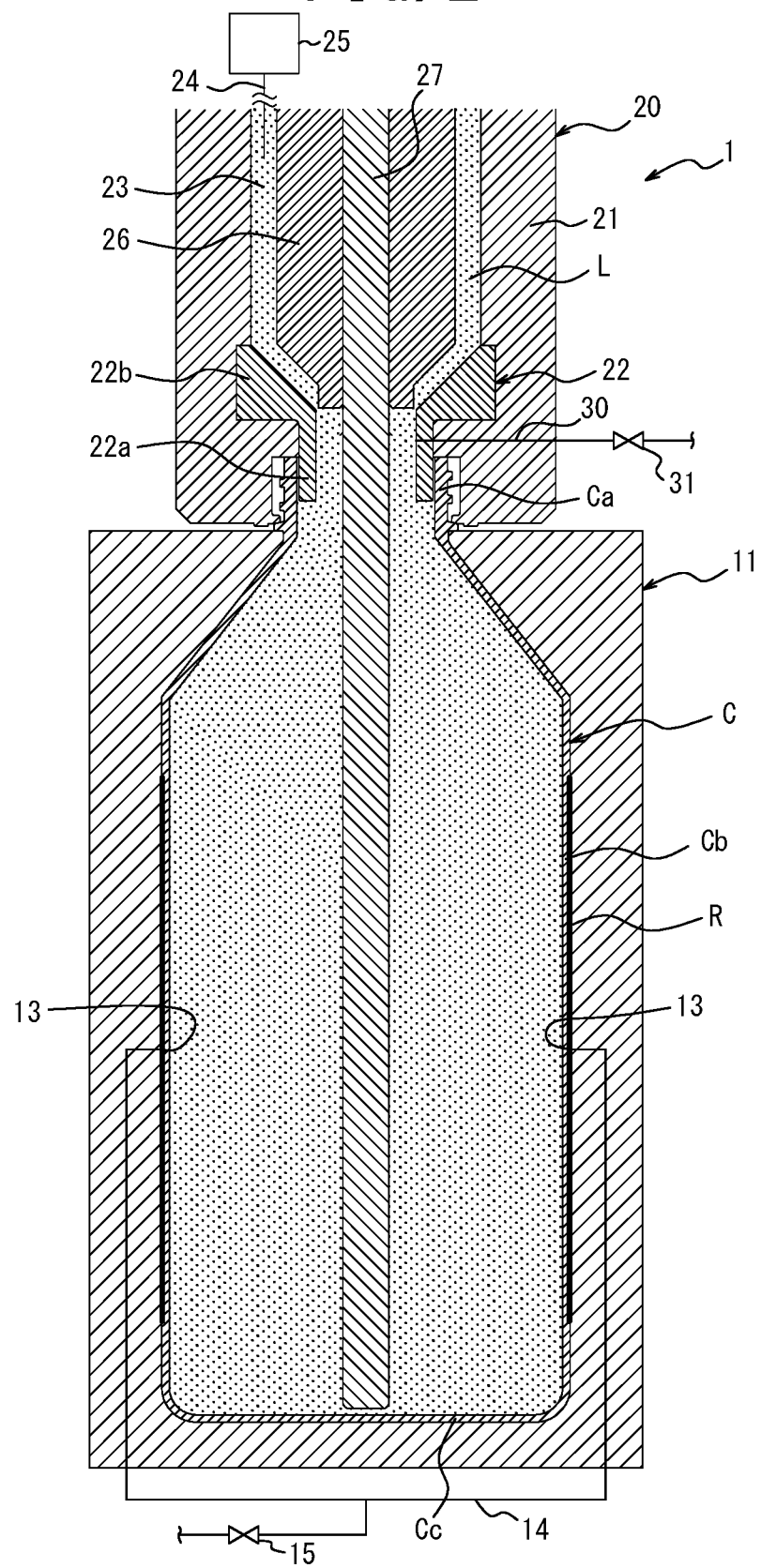
FIG. 2 is a longitudinal cross-sectional view illustrating a state in which the preform is liquid blow molded, in a blow molding step of the container manufacturing method according to an embodiment of the present disclosure.

When the preform setup step is finished, subsequently the blow molding step is performed. In the blow molding step, as illustrated in FIG. 2, the seal body 26 is moved upward such that the filling nozzle 22 is opened, and the pressurized liquid supply portion 25 is operated. In this manner, a pressurized liquid L is supplied from the pressurized liquid supply portion 25 to the liquid supply path 23 and the liquid L is supplied from the mouth portion PFa into the preform PF through the filling nozzle 22. Thus the pressurized liquid L is supplied into the preform PF. In this manner, the preform PF is liquid blow molded into a container C of a shape conforming to the cavity 12 of the blow molding mold 11.

In the blow molding step, the biaxial stretch blow molding can be performed by stretching the preform PF in the longitudinal (axial) direction by using the stretching rod 27. In this case, supply of the liquid L may be started during or after the axial stretching by the stretching rod 27. By using the stretching rod 27, misalignment of the preform PF during molding can be suppressed. It is not necessary for the stretching rod 27 to stretch the preform PF from the beginning, and the preform PF may be axially stretched further by the stretching rod 27 after it is axially stretched to some extent by using the liquid L only.

Figure 3:
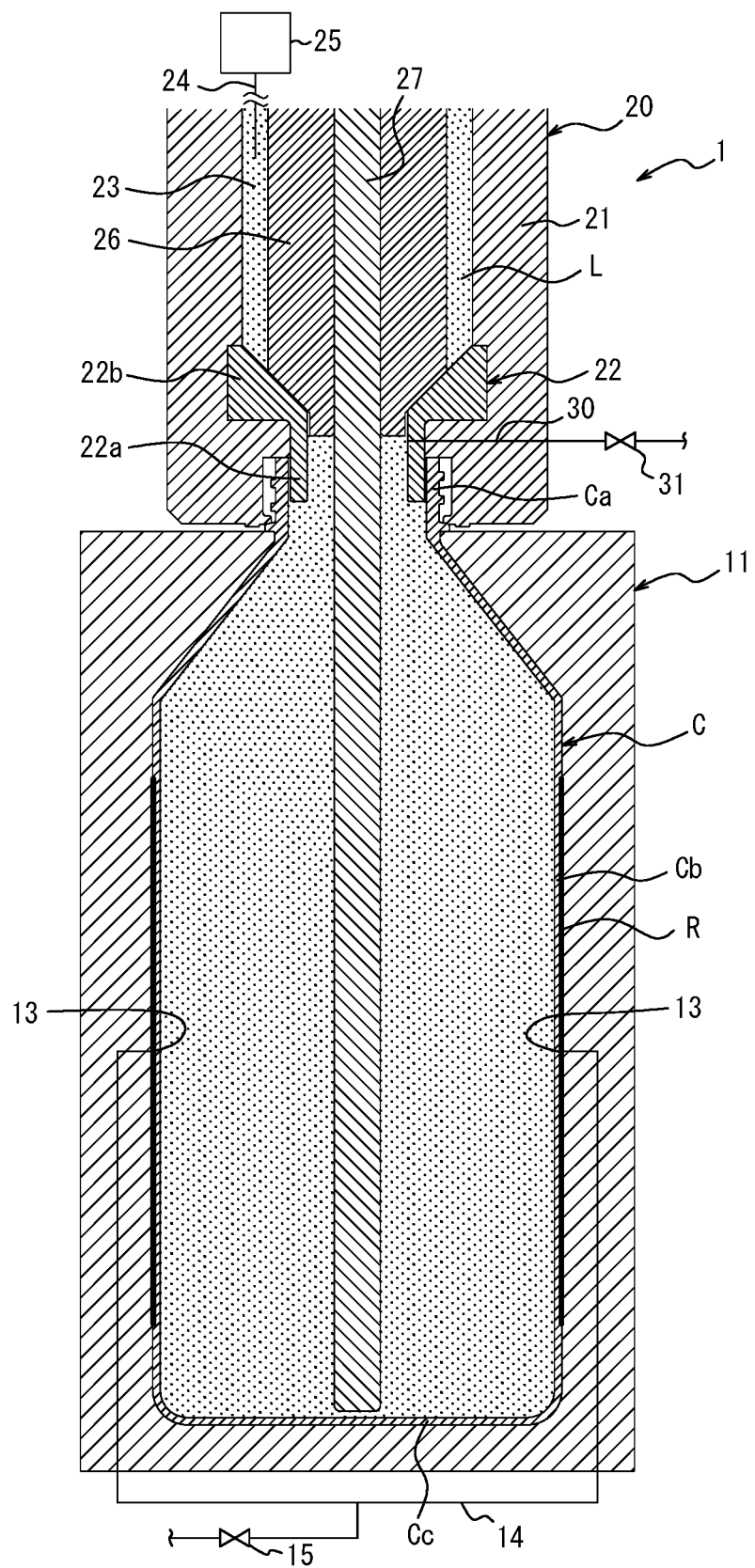
FIG. 3 is a longitudinal cross-sectional view illustrating a state in which a filling nozzle is closed with respect to a liquid supply path and a discharge path is opened, in a liquid discharge step of the container manufacturing method according to an embodiment of the present disclosure.
Figure 4:
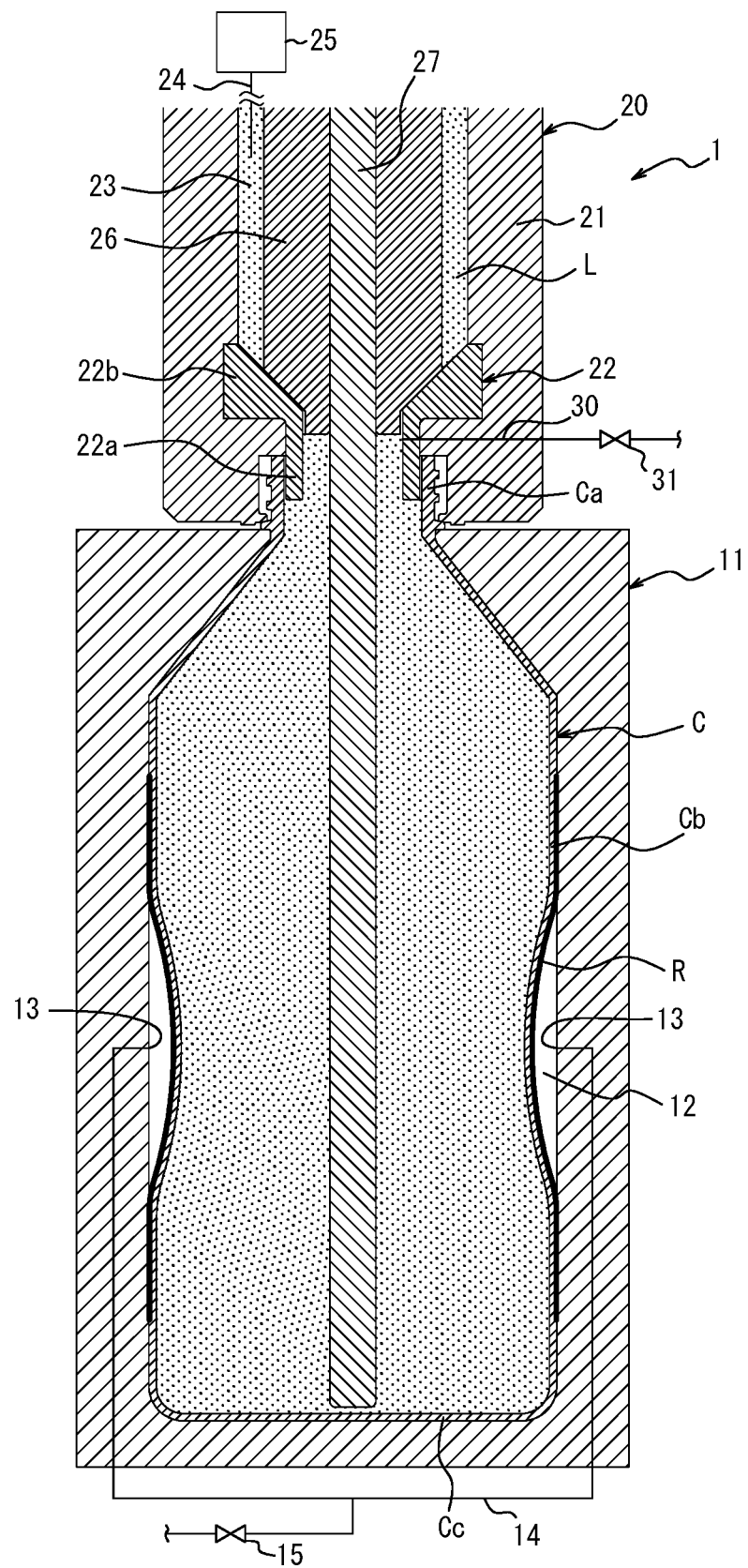
FIG. 4 is a longitudinal cross-sectional view illustrating a state in which an outer surface of the container after molding is pushed by the air, in the liquid discharge step of the container manufacturing method according to an embodiment of the present disclosure.

When the blow molding step is finished, subsequently the liquid discharge step is performed. In the liquid discharge step, first, as illustrated in FIG. 3, the filling nozzle 22 is closed, and the discharge path 30 is opened with the pressurized liquid supply portion 25 stopped. Next, as illustrated in FIG. 4, pressurized air is supplied from the air holes 13 to the cavity 12, and the outer surface of the barrel Cb of the container C after molding is pushed by the air, which causes the barrel Cb of the container C to be elastically deformed such that the content amount thereof is decreased, and a predetermined amount of liquid L contained in the container C is discharged from the mouth portion Ca out of the container C toward the discharge path 30. The liquid L discharged toward the discharge path 30 is stored in a tank. The liquid L stored in the tank can be reused as a liquid L for the liquid blow molding. The amount of liquid L discharged toward the discharge path 30 from inside of the container C can be set to a predetermined amount by changing the amount of air flown from the air holes 13. In this manner, a predetermined amount of liquid L is discharged from the container C after molding by deforming the barrel Cb of the container C, and as a result, the container C will be in a state in which a liquid L of an amount smaller than its full amount is contained therein.

As with this embodiment, when a biaxial stretch blow molding using the stretching rod 27 is performed in the blow molding step, the barrel Cb may be pushed by the air from the air holes 13 while the stretching rod 27 is left in the container C after molding, as illustrated in FIG. 4, or the barrel Cb may be pushed by the air from the air holes 13 after the stretching rod 27 is pulled out of the container C after molding.

Figure 5:
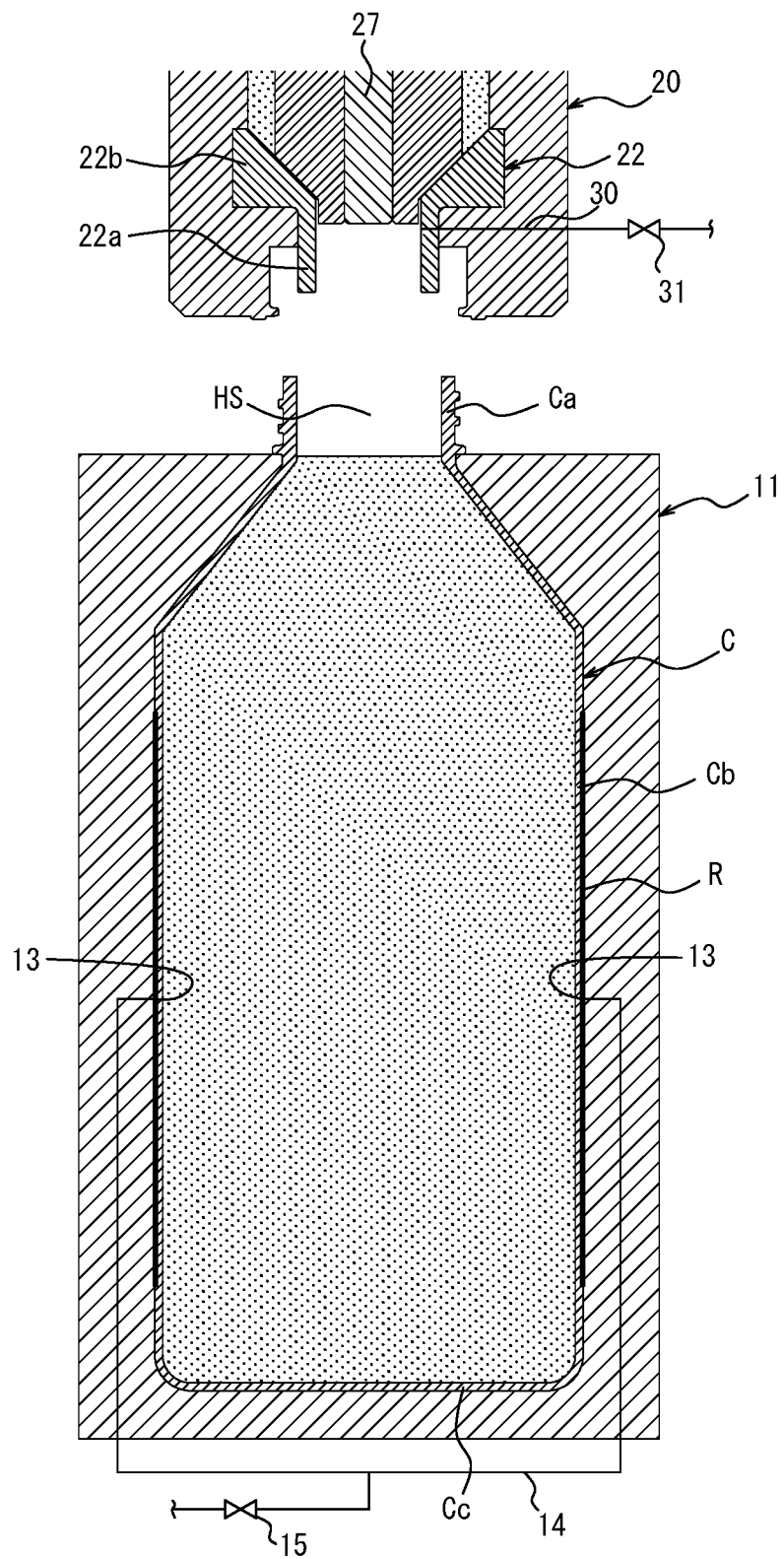
FIG. 5 is a longitudinal cross-sectional view illustrating a state in which the discharge path is closed and the filling nozzle is separated from a mouth portion of the container after molding, in a headspace forming step of the container manufacturing method according to an embodiment of the present disclosure.

When the liquid discharge step is finished, subsequently the headspace forming step is performed. In the headspace forming step, as illustrated in FIG. 4, the discharge path 30 is closed in a state in which the barrel Cb of the container C is pushed by the air from the air hole 13, that is, in a state in which a predetermined amount of liquid L is discharged from the container C. Subsequently, as illustrated in FIG. 5, the nozzle unit 20 is raised to the original position and the filling nozzle 22 is separated from the mouth portion Ca. In this case, the discharge path 30 is closed, and thus the liquid L discharged toward the discharge path 30 will not return to the container C. In this manner, the barrel Cb of the container C is restored to a shape at the time when the liquid blow molding is finished, and a headspace HS of a desired size is formed therein.

The liquid discharge step may be performed without using the discharge path 30. In this case, in the liquid discharge step, pressurized air is supplied from the air holes 13 to the cavity 12 with the filling nozzle 22 opened with respect to the liquid supply path 23 such that the outer surface of the container C is pushed by the air and a predetermined amount of liquid L in the container C is discharged out of the container C toward the liquid supply path 23. Further, in the headspace forming step, the filling nozzle 22 is closed with respect to the liquid supply path 23, and the filling nozzle 22 is separated from the mouth portion Ca of the container C in a state in which a predetermined amount of liquid L is discharged to the outside. In this manner the headspace HS can be formed in the container C.

According to the container manufacturing method of this embodiment, after the preform PF is liquid blow molded, pressurized air is supplied from the air holes 13 provided in the blow molding mold 11 to the cavity 12 and the outer surface of the container C is pushed by the air, which causes a predetermined amount of liquid L in the container C to be discharged out of the container C and a headspace HS is formed in the container C. Thus a headspace HS of a desired size can be formed in the container C without making a configuration of the blow molding mold 11 complicated. Consequently a manufacturing cost of the container C can be reduced.

According to this embodiment, in the blow molding step, the preform PF is liquid blow molded in a state in which the label R is adsorbed on the air holes 13 in the cavity 12 by sucking the air from the air hole 13. In this manner, an adsorption hole of the label R serves also as the air hole 13 for forming the headspace HS, and as a result, when an in-mold label R is provided to the container C, a configuration of the blow molding mold 11 can be simplified.

Needless to say, the above described embodiment is merely an example of the embodiment according to the present disclosure, and various changes may be made without departing from the gist of the present disclosure.

For example, in the above described embodiment, although a container manufacturing method according to the present disclosure is performed by using the liquid blow molding apparatus 1 configured as illustrated in FIGS. 1 to 5, the container manufacturing method according to an embodiment of the present disclosure can be performed by using the liquid blow molding apparatus or the like of other configurations.

REFERENCE SIGNS LIST

1 Liquid blow molding apparatus
11 Blow molding mold
12 Cavity
13 Air hole
14 Air supply path
15 Opening-closing valve
20 Nozzle unit
21 Main body block
22 Filling nozzle
22a Nozzle body
22b Clamping portion
23 Liquid supply path
24 Pipe
25 Pressurized liquid supply portion
26 Seal body 27 Stretching rod
30 Discharge path
31 Opening-closing valve
PF Preform
PFa Mouth portion
PFb Barrel
PFc Male thread
L Liquid (content liquid)
HS Headspace
C Container
Ca Mouth portion
Cb Barrel
Cc Bottom
R Label (in-mold label)

The invention claimed is:

1. A container manufacturing method for manufacturing a container that contains a content liquid by liquid blow molding a synthetic resin preform, the method comprising:
a preform setup step in which the preform is disposed in a blow molding mold and a filling nozzle connected to a liquid supply path is engaged with a mouth portion of the preform;
a blow molding step in which the preform is liquid blow molded into a shape conforming to a cavity of the blow molding mold by supplying a pressurized liquid supplied to the liquid supply path from the filling nozzle into the preform;
a liquid discharge step in which a predetermined amount of liquid in the container is discharged to the outside of the container by supplying pressurized air from air holes provided in the blow molding mold to the cavity and pushing an outer surface of the container by the pressurized air after molding; and
a headspace forming step in which a headspace is formed in the container by separating the filling nozzle from a mouth portion of the container in a state in which a predetermined amount of liquid is discharged to the outside.

2. The container manufacturing method according to claim 1, wherein, in the blow molding step, the preform is liquid blow molded in a state in which a label is adsorbed on the air holes in the cavity by sucking air from the air hole.

* * * * *